United States Patent
Jackson et al.

(10) Patent No.: US 9,407,197 B2
(45) Date of Patent: Aug. 2, 2016

(54) CATALYTIC SMOG REDUCTION

(71) Applicants: Gerald Peter Jackson, Lisle, IL (US); Jason Ryan Babcock, St. Charles, IL (US); Joseph Matthew Zlotnicki, Downers Grove, IL (US)

(72) Inventors: Gerald Peter Jackson, Lisle, IL (US); Jason Ryan Babcock, St. Charles, IL (US); Joseph Matthew Zlotnicki, Downers Grove, IL (US)

(73) Assignee: Green Light Industries, Inc, West Chicago, IL (US)

( * ) Notice: Subject to any disclaimer, the term of this patent is extended or adjusted under 35 U.S.C. 154(b) by 285 days.

(21) Appl. No.: 13/932,802

(22) Filed: Jul. 1, 2013

(65) Prior Publication Data

US 2013/0291931 A1 Nov. 7, 2013

Related U.S. Application Data

(63) Continuation-in-part of application No. 12/508,447, filed on Jul. 23, 2009, now Pat. No. 8,475,751.

(60) Provisional application No. 61/083,007, filed on Jul. 23, 2008.

(51) Int. Cl.
*H02S 10/30* (2014.01)
*B01D 53/86* (2006.01)
*B01D 53/94* (2006.01)

(52) U.S. Cl.
CPC ............ *H02S 10/30* (2014.12); *B01D 53/8696* (2013.01); *B01D 53/9495* (2013.01); *B01D 2251/11* (2013.01); *B01D 2256/20* (2013.01); *B01D 2257/404* (2013.01); *B01D 2257/702* (2013.01)

(58) Field of Classification Search
CPC ..... H02S 10/30; H02S 40/44; H01L 31/0406; B01D 53/8696; B01D 53/9495
USPC ........ 136/253, 291, 248; 250/493.1; 422/168, 422/177, 180
See application file for complete search history.

(56) References Cited

U.S. PATENT DOCUMENTS 5,044,939 A * 9/1991 Dehlsen ........................ 136/253

* cited by examiner

*Primary Examiner* — Jill Warden
*Assistant Examiner* — Joye L Woodard
(74) *Attorney, Agent, or Firm* — Peter K Trzyna (57) ABSTRACT

Illustratively, an electrical generator includes a photovoltaic element which converts light produced by a surface into electrical power, the surface located in thermal communication with exhaust gases produced by an exothermic chemical reaction; a heat exchanger which takes at least a majority of thermal energy in the exhaust gases, after the thermal communication, and transfers the thermal energy to air input to the reaction; a catalytic converter, inside the heat exchanger, located to ensure that at least most of the exhaust gases are communicated into the catalytic converter and that heat generated by operation of the catalytic converter is transferred to the air input to the reaction; a sensor in the heat exchanger, located to monitor the reaction before the exhaust gases are communicated into the catalytic converter; a sensor located to sense after the exhaust gases are communicated into the catalytic converter, whether the catalytic converter is functioning properly.

9 Claims, 8 Drawing Sheets

Schematic representation of a catalytic converter in a generator based on photovoltaic conversion of chemical energy into electrical power.

Figure 1: Schematic representation of a catalytic converter inside a container.

Figure 2: Set of schematic representations of catalytic converter applications

Figure 3: Schematic representation of the catalytic converter assembly.

Figure 4: Schematic representation of one embodiment of a computer system used to order a catalytic converter.

Figure 5: Schematic representation of a catalytic converter in a generator based on photovoltaic conversion of chemical energy into electrical power.

Figure 6: Chart of representative fuels.

Figure 7: List of catalytic converter chemical reactions.

Figure 8: Chart of generator components.

CATALYTIC SMOG REDUCTION

PRIORITY CLAIM

This patent application is a continuation-in-part, claims benefit, and incorporates by reference, from U.S. patent application Ser. No. 12/508,447 having the same title and filed Jul. 23, 2009 by the same inventors. Ser. No. 12/508,447 claims benefit, and incorporates by reference, from U.S. Patent Application Ser. No. 61/083,007 having the same title and filed Jul. 23, 2008 by the same inventors.

TECHNICAL FIELD

The technical field includes machine, manufacture, process, and product produced thereby, as well as necessary intermediates. In some cases, the technical field may pertain to smog reduction. The technical field may also pertain to electricity generation.

MODES

Embodiments herein relate to reducing concentration of undesirable matter, such as compounds, in the exhaust from the combustion of a fuel with an oxidizer. Other embodiments relate to such combustion in an internal combustion engine. Yet other embodiments relate to such combustion in a generator of thermal energy. Further embodiments herein relate to undesirable matter, such as compounds that can cause smog. Additional embodiments herein relate to internal combustion engines smaller than those typically found in automobiles. Still further embodiments herein relate to the reduction of undesirable compounds using one or more catalysts. More embodiments herein relate to apparatus and methods for the reduction of undesirable compounds wherein a visual indicator that the catalytic process of undesirable compounds reduction is underway.

Figure 1:
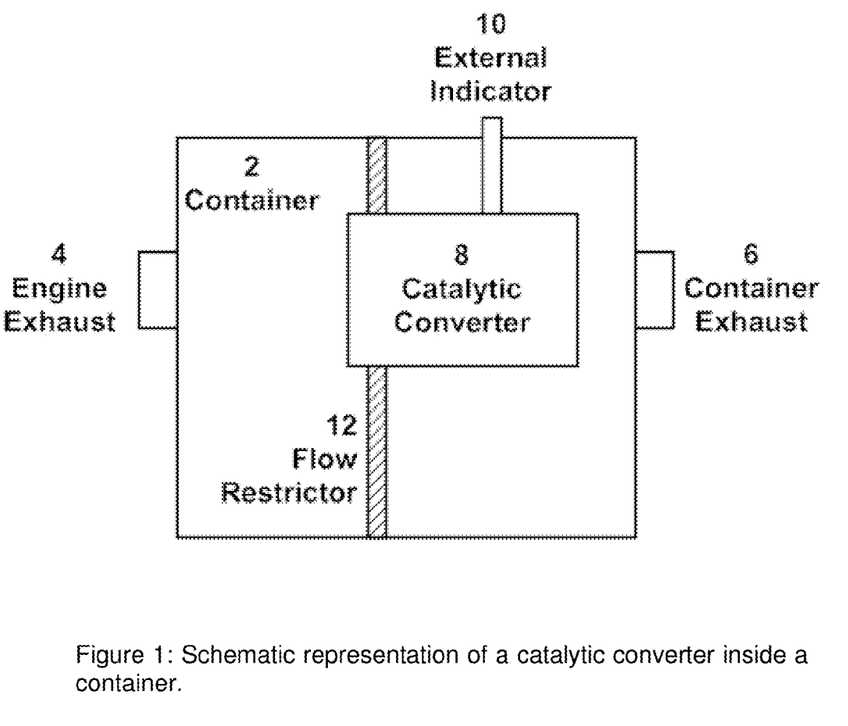
FIG. 1 is a schematic representation of a catalytic converter inside a container.

FIG. 1 is an illustration of a catalytic converter inside a container 2. In the case of some catalytic converter embodiments, such as those used in connection with boilers and other forms of reactors, a noise reduction function for the container may not be required. In a standard muffler, between the engine exhaust 4 and the container exhaust 6, one or more flow restrictors 12 can be used to provide varying path lengths of the highly compressed output pulse of exhaust gasses from an internal combustion engine. This dispersion in path lengths reduces the severity of the gas pulse, reducing the sound level it produces when coming into contact with the atmosphere.

In one embodiment, catalytic material applied to a substrate material (the combination typically referred to as a catalytic converter 8) is located inside a container 2 such that the catalytic converter 8 is constrained by one or more flow restrictor structures 12 in order to assure that a majority of the exhaust gas coming from the engine exhaust 4 is forced through the catalytic converter 8 before reaching the container exhaust 6.

In the case of automotive catalytic converters 8, oxygen sensors 306 are employed in the exhaust system that are linked to an onboard computer. This computer varies the air-fuel mixture in order to periodically oxygenate the catalyst material and the trigger an engine warning light. The log file data from this computer is also read out and used in many states in lieu of actual exhaust testing during emission inspections.

A problem with this approach is that oxygen monitors 306 are very expensive, often more expensive than the cost of a new lawnmower or other typical application. Therefore, an alternative method is desired to assure the consumer that the catalyst material is intact and that the catalytic converter 8 is functioning.

In response to this desire, an embodiment herein is to add an optically transparent or translucent light guide 10 between the catalytic converter 8 and the outside surface of the container 2. Because the catalyzed chemical reactions within a catalytic converter 8 are predominantly exothermic, the increased temperature of the exhaust gases causes the substrate material 42 within the catalytic converter 8 to heat to a point of emitting blackbody radiation. This blackbody radiation, which includes visible light, is coupled to the transparent or translucent light guide 10. This provides an external indicator 10 that the catalytic converter 8 is functioning.

Figure 2:
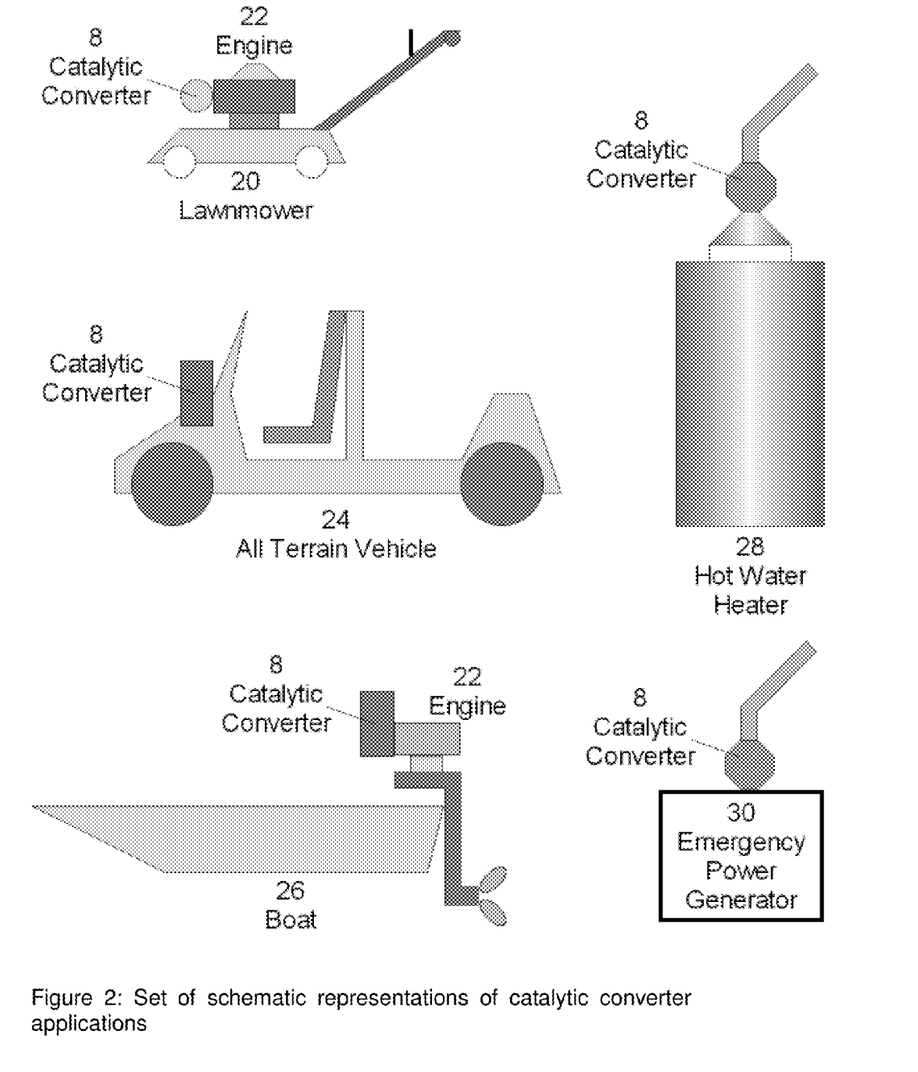
FIG. 2 is a set of schematic representations of catalytic converter applications.

Though this specification disclosure addresses all embodiments that respectively pertain to any device producing the chemical(s) removed, for the prophetic teaching purposes herein, consider particularly two representative kinds of combustion embodiments. Schematic representations can be found in FIG. 2. The first is the addition of catalytic converters 8 to lawnmowers 20. A similar application is recreation vehicles such as ATV's 24 and outboard motors for small boats 26. The second is the addition of catalytic converts to natural gas water heaters 28 and emergency power generators 30, even those based on the harvesting of blackbody radiation emitted from a surface heated with chemical energy, disclosed earlier in U.S. patent application Ser. No. 11/828,311 (U.S. Pub. No. 2008/0245407) by one of the current inventors, and incorporated herein by reference. In general, though, the technology offered herein can be applied to any engine, boiler, or reactor of size or power rating, especially ones less than those of an automobile.

Combined muffler/catalytic converter for lawnmowers without an external indicator and flow channeling for maintaining cooled muffler surfaces have been disclosed earlier in U.S. Pat. Nos. 4,867,270; 5,338,903 (expired); U.S. Pat. Nos. 5,548,955; 6,158,214; 6,315,076; 7,011,179; 7,156,202; and 7,281,606; which are all incorporated herein by reference.

A disadvantage of catalytic converters 8 is the increase in temperature of the gases at the muffler exhaust 6. The catalyzed chemical reactions enhanced by the catalytic material(s) are net exothermic. This means that the exhaust gas is heated by passage through the catalytic converter 8. It would seem that for a standard 6 hp lawnmower engine, the exhaust temperature can increase from roughly 700° C. to 950° C.

In embodiments herein, any combination of two concepts can be added, especially in the manner of an after-market catalytic converter. First, the exhaust flow from the engine before passage through the catalytic converter can be routed in order to produce a cooler muffler wall. Second, a small optical waveguide 10 can be added between the catalytic converter 8 surface (which glows with a yellow-orange color) and the outside wall of the muffler 2. This external glow provides assurance to the lawnmower operator that the converter is actually working. (Another indicator, such as a visual indicator, such as an optic fiber or other way to optically or otherwise communicate the functioning of the converter, is illustrative of other embodiments.) Third, the catalytic converter 8 is placed close enough to the muffler exhaust 6 to pull in oxygen from the atmosphere between gas bursts from the engine exhaust 4 when the exhaust gases cool down and create a short period of negative pressure within the muffler 2. The oxygenation of one or more catalytic materials in the catalytic converter 8 enables one or more of the reactions needed to reduce concentrations of undesirable matter. And as may be preferred in one application or another, the concept(s) can be configured to accommodate cowlings, gas tanks, and operator protection grills covering the muffler.

Figure 3:
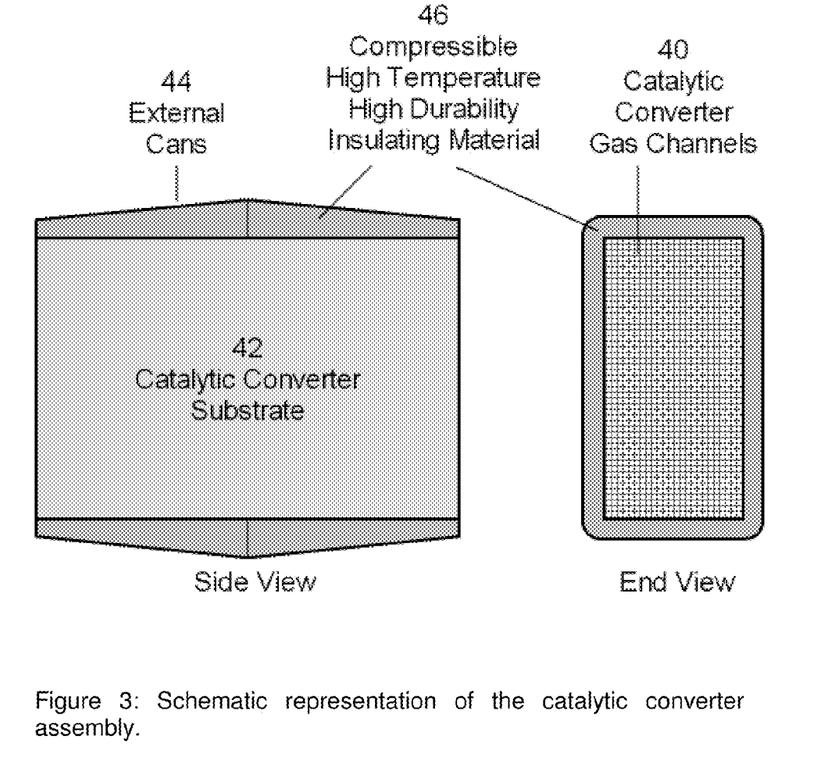
FIG. 3 is a schematic representation of the catalytic converter assembly.

FIG. 3 contains a schematic representation of a catalytic converter substrate 42 supporting gas channels 40 supported by a compressible, high temperature, high durability, and insulating material 46 that is compressed transversely by one or more external cans 44. The external cans 44 are shaped such that the transverse dimensions of the cans with respect to the direction of gas flow is tapered. By pushing and attaching these external cans 44, a preloaded pressure is created within the insulating material 46 such that the substrate 42 is immobilized and all gases can pass through the gas channels 40.

On the materials side, an embodiment can be carried out by carving up an automotive catalytic converter to produce smaller catalytic converters. Because of the enormous quantities of automotive catalytic converters that are produced, the cost per unit is so low that considerable cost savings are realized during the fabrication of smaller catalytic converters by cutting up catalytic converters, and in some embodiments to harvest their catalysts bonded to their substrate material. This may be counter-intuitive to many practitioners in this field because of the short design lifetime of lawnmower engines (on the order to 150 hours) compared to that of an automobile engine (roughly 100,000 miles or 5000 hours).

Another embodiment comprises retrofitting configurations such that muffler/catalytic converter sizes and shapes fit onto existing lawnmowers, outboard boat motors, and other applications as possible with the fewest possible models. There are many different types of engine exhaust configurations, exhaust hole diameters, threaded hole placements, and dimensional constraints such as cowlings, gas tanks, and operator protection grills covering the muffler.

Figure 5:
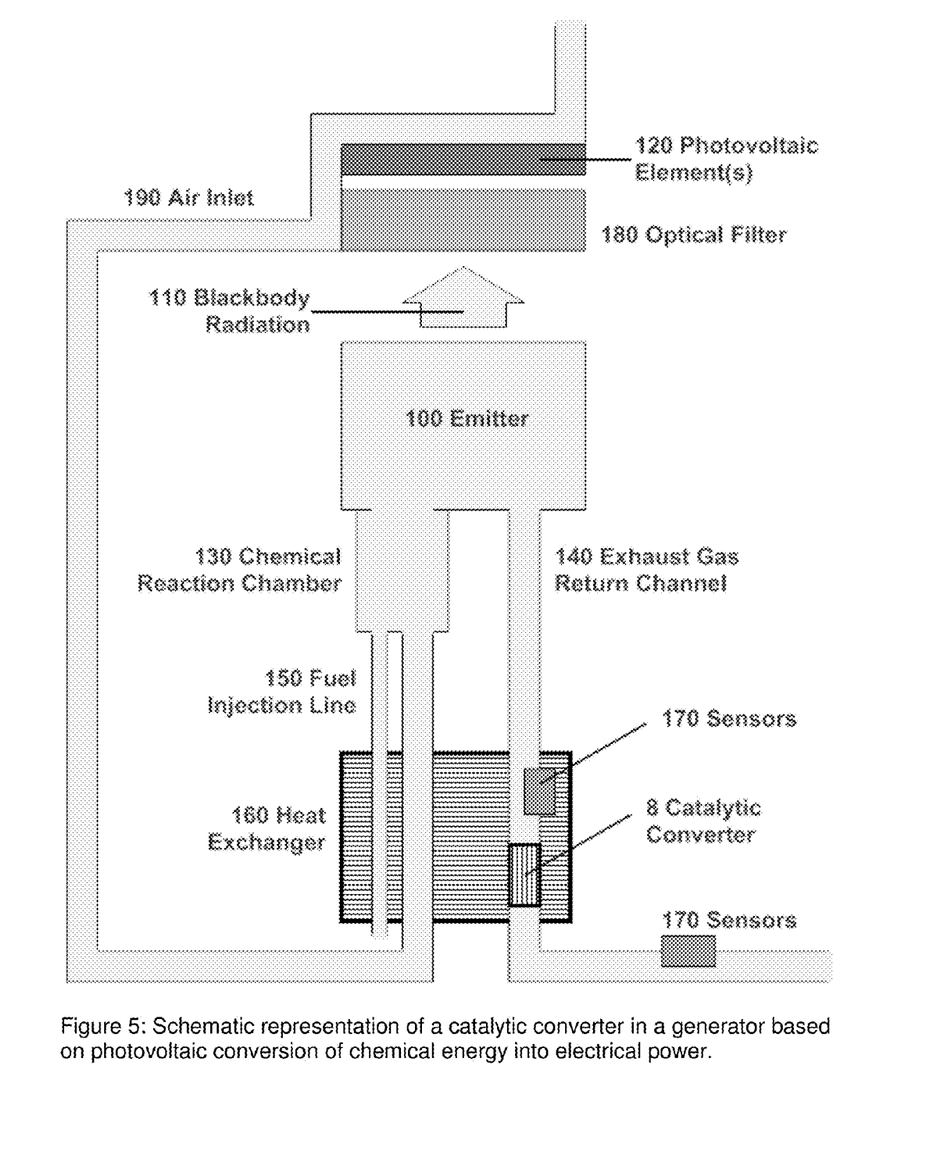
FIG. 5 is a schematic representation of a catalytic converter in a generator based on photovoltaic conversion of chemical energy into electrical power.

As previously mentioned, embodiments can, but need not always, use one or more catalytic converters 8 in cooperation with one or more electrical generators 30 by harvesting blackbody radiation 110 emitted from a surface, such as an emitter 100, heated with chemical energy. For example, consider that which is disclosed in U.S. patent application Ser. No. 11/828,311 (incorporated by reference) by one of the current inventors. As illustrated in FIG. 5, harvesting is performed by using photovoltaic element(s) 120.

Figure 6:
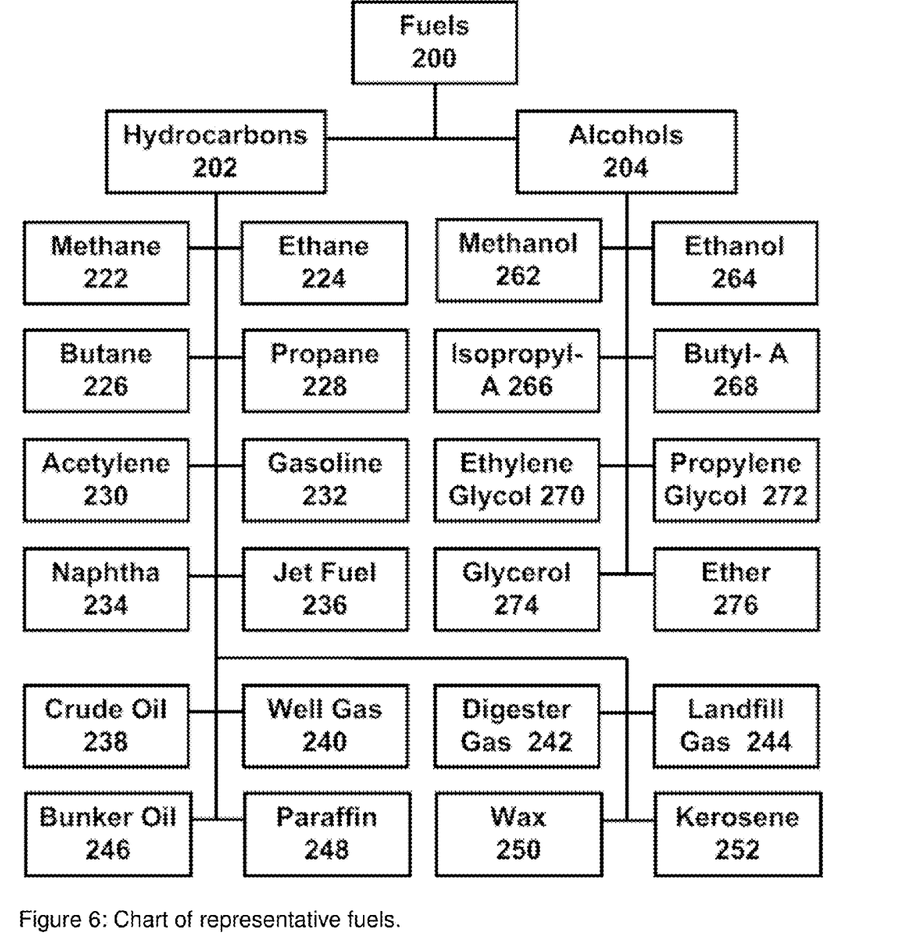
FIG. 6 is a chart of representative fuels.

The chemical energy can, but need not in all embodiments, be produced by burning fuels 200 in air. As shown in FIG. 6 traditional fuels 200 include, but are not limited to, hydrocarbons 202 such as methane 222, ethane 224, butane 226, propane 228, acetylene 230, gasoline 232, naphtha 234, jet fuel 236, crude oil 238, well gas 240, bunker oil 246, paraffin 248, wax 250, and kerosene 252. Other hydrocarbons 202 that come from non-traditional sources are digester gas 242 from waste treatment plants and landfill gas 244. Similarly, alcohols 204 that can be used as fuels are methanol 262, ethanol 264, isopropyl-A 266, butyl-A 268, ethylene glycol 270, propylene glycol 272, glycerol 274, and ether 276.

The photovoltaic element(s) 120 can be semiconductors that convert blackbody radiation photons 110 into electric power. One such semiconductor is indium gallium phosphide (InGaP) on an indium phosphide (InP) substrate. In order to improve conversion efficiency from light to electricity, the surface of each element 120 facing away from the blackbody radiation 110 (the back side) is mirrored to reflect unconverted blackbody radiation 110 back toward the emitter 100. This mirroring rejects wavelengths in the infrared range (or other range if so preferred for another embodiment) that are not converted into electricity (and hence have the ability to twice traverse the thickness of the semiconductor).

A fraction of the blackbody radiation 110 with visible wavelengths can be absorbed by the semiconductor material of the photovoltaic element(s) 120 without being converted into electricity, contributing to a temperature rise of the element 120. Because these photovoltaic element(s) 120 have higher conversion efficiencies when kept cool, e.g., below 100° C., between 100° C. and 20° C., or less than 20° C., an air inlet can be first put into thermal contact with the element(s) 120 to maintain or optimally cool temperatures. As illustrated in FIG. 5, after the photovoltaic element(s) 120 the air inlet then makes thermal contact with an optical filter 180, transferring the heat from absorbing blackbody radiation back into the generator 30 via the incoming air flow. The optical filter 180 functions similarly to the back mirroring, preventing the heating of the photovoltaic element(s) 120 by blackbody radiation 110 wavelengths that are not converted into electricity.

For a generator to have high conversion efficiency from chemical energy to electrical power, parasitic sources of heat loss need to be diminished or eliminated. For example, in an automobile hot exhaust gases represent a source of parasitic energy loss. In addition, the cooling system composed of a radiator through which air is passed to cool the engine is another source of parasitic energy loss. But if engines such as those in automobiles did not have these losses, the engine would fail through structural failure or decomposition of lubricating oil.

In one embodiment, a generator 30 can be comprised of high temperature materials that have higher melting points than those found in traditional generators 30. By insulating the surface of the generator 30 to prevent cooling to the surrounding air, higher conversion efficiencies are enabled. Also to improve conversion efficiency, the thermal energy in exhaust gases can be transferred into the incoming air. As illustrated in FIG. 5, this thermal transfer can occur in a heat exchanger 160. Also, an exhaust gas return channel 140 can carry exhaust gases in the opposite direction as fuel 200 and incoming air, carried in one or more fuel injection lines 150 and in one or more air inlets 190, respectively. One or more of these efficiency improvements can be carried out in one embodiment or another, as may be preferred for the particular application at issue.

In order to minimize smog-generating chemicals in the exhaust gases, an embodiment may have one or more catalytic converters 8 imbedded in the heat exchanger 160. Because there is a temperature gradient along the length of the heat exchanger 160, the placement of the catalytic converter(s) 8 in the exhaust gas return channel(s) 140 within the heat exchanger 160 can be used to set the operating temperature of the catalytic converter(s) 8.

In general, the catalytic converter(s) 8 should operate at a temperature of approximately 500° C., as can be measured by a temperature sensor 302 sampling the exhaust gases either before or after any catalytic converter(s) 8. The exhaust gases rise in temperature as they traverse the catalytic converter(s) 8. If a catalytic converter 8 operates at temperatures greater than 700° C. for a long duration, it may become permanently damaged.

A parameter that minimizes smog-generating chemicals in the exhaust gases is the ratio of fuel to air. One method for regulating the air-fuel ratio is by using a sensor 170 to measure the concentration of oxygen in the exhaust gases. Other sensors can, if so desired in an embodiment of interest, measure exhaust gas humidity 304, temperature 302, light 300, pressure 308, liquid level 310 of either fuel or water generated in the combustion process, flammable gases 314, and concentrations of smog-generating chemicals 312 such as uncombusted hydrocarbons, carbon monoxide (CO), nitrogen oxide (NO), and nitrogen dioxide ($NO_2$). As illustrated in FIG. 5, a location for an oxygen sensor 306 diagnosing air-fuel ratio is in the heat exchanger 160 before the catalytic converter 8. If the oxygen sensor 306 is too hot, it will fail. If the oxygen sensor 306 is too cold, an embedded heater element inside the oxygen sensor 306 can be powered in order to reach the specified sensor temperature and assuring proper operation.

Photocells 300 can be used to monitor objects that are glowing, such as the center of oxygen sensors 306 or the exterior of the heat exchanger 160. Because the interior of such a generator can run as high as 2400° C., temperature sensors 302 such a thermocouples are desired, due to their high service temperature rating. Humidity sensors 304 are useful to determine the air-fuel ratio. Pressure 308 and liquid level 310 sensors are used for two purposes. First, to determine the flow rate and reserve levels of fuels. Second, to monitor the buildup of liquid water produced in the combustion process itself.

Figure 7:
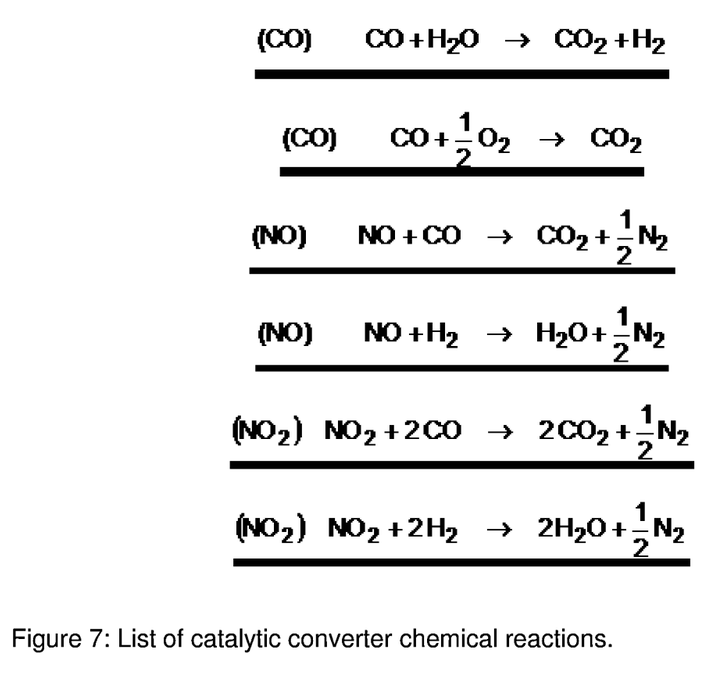
FIG. 7 is a list of catalytic converter chemical reactions.

FIG. 7 contains an illustrative list of some chemical reactions that occur within a catalytic converter 8. In order to diagnose the minimization of smog-generating chemicals simultaneously with monitoring air-fuel ratio, the use of a second sensor 170, or group of sensors, after the catalytic converter 8 can be employed. For example, an oxygen sensor 306 after the catalytic converter 8 can be placed within the heat exchanger 160 in order assure proper operations without the use of the internal heater element.

Sensors 170 can also be used to monitor each catalytic converter 8 itself. Sensors 170 measuring parameters such as light emission 300 and temperature 302 are direct measures of the amount of chemical energy released by the chemical reactions in FIG. 7.

In some embodiments, more than one catalytic converter 8 is used in each exhaust gas return channel 140. In order to optimize the smog-generating chemical concentration at the exhaust port of the generator 6, each catalytic converter 8 can be operated at a different temperature. In order to separately reduce carbon monoxide and uncombusted hydrocarbons, incoming air from the heat exchanger 160 or external to the generator 30 can be injected between catalytic converters 8.

Figure 8:
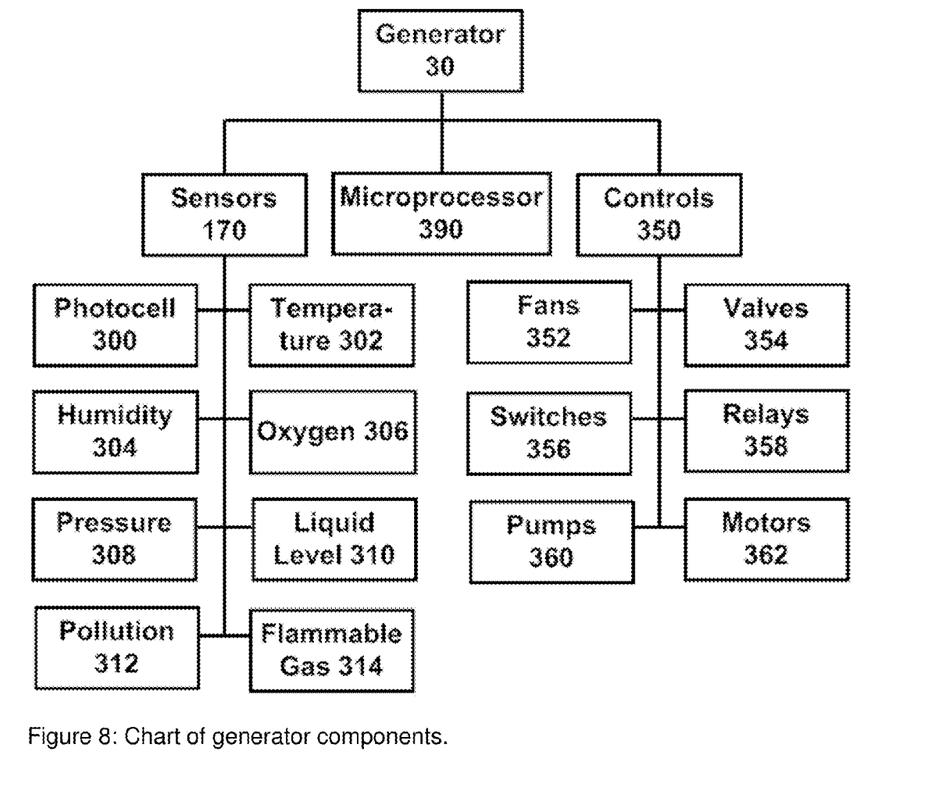
FIG. 8 is a chart of generator components.

In some embodiments, added to the generator 30 is a microprocessor 390 that acquires signals from one or more sensors 170, calculates desired air and fuel flow rates, issues commands to fans 352, valves 354, switches 356, relays 358, pumps 360, motors 362, and other control mechanisms 350 in the apparatus, and reports its condition.

Figure 4:
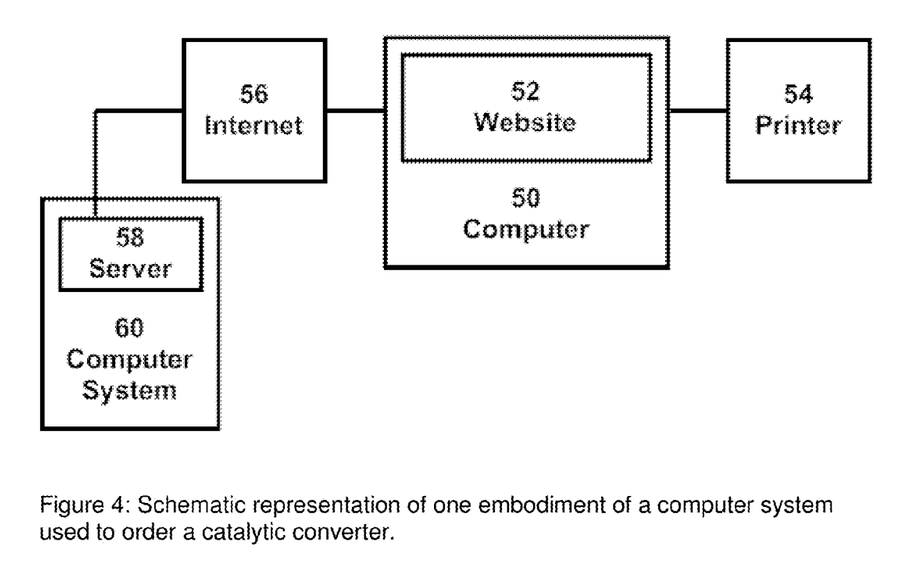
FIG. 4 is a schematic representation of one embodiment of a computer system used to order a catalytic converter.

Yet another embodiment, schematically illustrated in FIG. 4, comprises a computer system 60 to support one or more embodiments herein. The computer system 60 can comprise a server 58 or equivalent structure, e.g., one or more processors programmed to receive input data and transform the input data into output data, and in some cases, the computer system can communicate with other computer systems linked by networking via the internet 56. The computer system 60 (e.g., server 58) processor can be programmed to provide a website 52 to support one or more of the embodiments discussed herein. The web site 52 can also handle muffler sales in accordance herewith, and to provide potential customers with any of: printable drawings, paper cut-outs, pictures, and in-depth descriptions that allow choosing the correct muffler style. A potential customer can use their computer 50 to view the website 52 and print out such items using the printer 54 attached to their computer. An option can also be provided for customers to send their mufflers to the manufacturer or retrofitter for handling in accordance herewith. The handling can thus be carried out from shipping to return receipt, indeed, between mowing cycles. Such computer-implemented embodiments open up after-market muffler sales.

As used herein, the term "computer" generally refers to hardware or hardware in combination with one or more program(s), such as can be implemented in software. Computers can be implemented as general-purpose computers, specialized devices, or a combination of general-purpose and specialized computing devices. Computing devices can be implemented electrically, optically, quantumly, biologically, and/or mechanically or in any combination of these technologies. A computer as used herein can be viewed as at least one computer having all functionality or as multiple computers with functionality separated to collectively cooperate to bring about the functionality. This includes single processor and multi-processor implementations of a computer. A processor can include any device that processes information or executes instructions. Computer logic flow and operations can be used in processing devices, including but not limited to: signal processors, data processors, microprocessors, and communication processors. Logic flow can be implemented in discrete circuits, combinational logic, ASICs, FPGAs, reconfigurable logic, programmed computers, or an equivalent.

Computer-readable media or medium, as used herein, includes any technology that includes a characteristic of memory. Memory technologies can be implemented using magnetic, optical, mechanical, or biological characteristics of materials. Common examples of memory are RAM, ROM, PROM, EPROM, FPGA, and floppy or hard disks. Communications medium or connection, as used herein, is any pathway or conduit in which information can be communicated or exchanged. The pathway or conduit can be wired, optical, fluidic, acoustic, wireless, or any combination of the foregoing.

The computer system can include one or more computers, which illustratively can be PC systems or server systems, and any combination of the foregoing. Depending on the implementation, computers can be adapted to communicate among themselves, or over a network such as the Internet. Programs, as used herein, are instructions that when executed by a processing device causes the processor to perform specified operations. Programs can be written in various languages, including but not limited to assembly, COBOL, FORTRAN, BASIC, C, C++, or Java. Languages can be object oriented like C++ and Java, for example. The programming language can be interpretive or compiled, or a combination of both. The programs are usually processed by a computing system having an operating system. An operating system can be processor specific, like an RTOS (real time operating system) used in cell phones, or commercial like OSX, UNIX, Windows, or LINUX. An operating system or program can be hardwired, firmware, reside in memory or be implemented in an FPGA or reconfigurable logic.

For example, a computer system can comprise a computer (e.g., an IBM, Hewlett Packard, MAC, or other personal computer) with one or more processors (e.g., an Intel or AMD series processor or the like), a memory (e.g., RAM, a hard drive, disk drive, etc.), one or more input devices (e.g., keyboard, mouse, modem, or the like), and one or more output devices (e.g., a modem, a Hewlett Packard printer, a Dell monitor, or other such output device). Note that the modem is representative of a computer-to-computer communication device that can operate as an input/output device. To provide other illustrative embodiments, the computer system can comprise at least one of a desktop computer, a telephonic device, a console, a laptop computer, and a mobile communication device. The mobile communication device can comprise at least one of a cellular telephone, laptop, a PDA, and an IPhone-type device. Communications between devices may be wired, for example cabled Ethernet based home or office network, wireless through IEEE 802.11a/b/g network cards or Bluetooth, or optical through an IR port. Networking between devices may be through WANs, LANs, Intranets, Internet or peer-to-peer arrangements, or in a combination of them. Networks may include, for example, gateways, routers, bridges, switches, front end and back end servers, IPS (Internet service providers), content provider servers, scanners, copiers, printers and user computing devices. Devices on the network may include interfaces that can be as simple, such as a keyboard with an LCD screen, or can be complex, such as a web interface. Web interfaces are presented in a web browser environment. Web browsers render XML or HTML containing pictures and links in a window on the desktop, for example like Windows XP. Firefox, Monzilla, Internet Explorer, and Safari are examples of well known web browsers.

Accordingly, there can be a computer apparatus, process, and/or product including advertising availability of aftermarket replacement mufflers, which can if desired also contain one or more catalytic converters the reduce smog producing chemicals; providing a website with information to guide potential customers to the correct model number; and permitting potential customers to communicate their existing mufflers for measurements aimed at either choosing or producing a muffler containing a catalytic converter, such that the consumer communications are received at the web site. The website information can, if desired, include printable pages which, when the specified cutting, pasting, taping, and/or folding take place, create a three-dimensional representation for comparison with an existing muffler to be replaced. Depending on the preferred embodiment, the website information can include one or more pictures and/or drawings that prompt or assist potential customers in a choice of a replacement muffler that contains a catalytic converter.

In sum, appreciation is requested for the robust range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, those skilled in the art will readily appreciate that many modifications are possible in the exemplary embodiments without materially departing from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

The invention claimed is:

1. A method of producing electricity by using an electrical generator while sensing whether a catalytic converter is properly functioning, the method comprising:
   converting light produced on one or more emitting surfaces into electrical power by one or more photovoltaic elements, wherein said one or more emitting surfaces are located in thermal communication with exhaust gases produced by an exothermic chemical reaction of a fuel with air;
   taking, by a heat exchanger, at least a majority of thermal energy in said exhaust gases after said thermal communication, and transferring, by the heat exchanger, the thermal energy to air before the air is input to said reaction;
   ensuring, with a catalytic converter inside said heat exchanger, that at least a majority of said exhaust gases are communicated into the catalytic converter and that heat generated by operation of the catalytic converter is transferred to the air before the air is input to said reaction;
   monitoring, with one or more sensors in the heat exchanger, said chemical reaction before said exhaust gases are communicated into said catalytic converter; and
   sensing after said exhaust gases are communicated into said catalytic converter, with one or more sensors, whether the catalytic converter is functioning properly.

2. An electrical generator comprising:
   one or more photovoltaic elements located to convert light produced on one or more emitting surfaces into electrical power, wherein said one or more emitting surfaces are located in thermal communication with exhaust gases produced by an exothermic chemical reaction;
   a heat exchanger which takes at least a majority of thermal energy in said exhaust gases, after said thermal communication, and transfers the thermal energy to air before the air is input to said reaction;
   a catalytic converter inside said heat exchanger, the catalytic converter located to ensure that at least a majority of said exhaust gases are communicated into the catalytic converter and that heat generated by operation of the catalytic converter is transferred to the air before the air is input to said reaction;
   one or more sensors in the heat exchanger, located to monitor said chemical reaction before said exhaust gases are communicated into said catalytic converter; and one or more sensors, located to sense after said exhaust gases are communicated into said catalytic converter, whether the catalytic converter is functioning properly.

3. The apparatus of claim 2, wherein said exothermic chemical reaction is an exothermic chemical reaction which produces at least one of uncombusted hydrocarbon, nitrogen monoxide (NO), nitrogen dioxide ($NO_2$), and carbon monoxide (CO), and the electrical generator is configured such that said one or more of the emitting surfaces are located in said thermal communication with said least one of the uncombusted hydrocarbon, the nitrogen monoxide (NO), the nitrogen dioxide ($NO_2$), and the carbon monoxide (CO) as said exhaust gases.

4. The apparatus of claim 2, wherein said catalytic converter is at least partially comprised of one or more automotive catalytic converters.

5. The apparatus of claim 2, further including a microprocessor that acquires signals from one or more of said sensors, calculates desired air and fuel flow rates, issues commands to at least one of a fan, valve, and other control means in the apparatus, and reports a condition of at least one of said sensors.

6. The apparatus of claim 2, wherein one or more photovoltaic elements comprises a back surface that is mirrored.

7. The apparatus of claim 2, wherein said one or more photovoltaic elements is in thermal communication with said air before the air is input to said heat exchanger.

8. The apparatus of claim 2, further including one or more optical filters located between said one or more emitting surfaces and said one or more photovoltaic elements.

9. The apparatus of claim 8, wherein said optical filters are in thermal communication with said air before the air is input to said heat exchanger.

* * * * *